(12) United States Patent
Zielinski et al.

(10) Patent No.: US 7,513,119 B2
(45) Date of Patent: Apr. 7, 2009

(54) SYSTEMS AND METHODS FOR STARTING AIRCRAFT ENGINES

(75) Inventors: Edward Zielinski, Seattle, WA (US); Alan T. Bernier, Seattle, WA (US); Kent W. Knechtel, Seattle, WA (US); Thomas A. Campbell, Seattle, WA (US); Jeffrey J. White, Seattle, WA (US); Mark D. Ralston, Seattle, WA (US)

(73) Assignee: The Boeing Company, Chicago, IL (US)

( * ) Notice: Subject to any disclaimer, the term of this patent is extended or adjusted under 35 U.S.C. 154(b) by 5 days.

(21) Appl. No.: 11/051,272

(22) Filed: Feb. 3, 2005

(65) Prior Publication Data

US 2006/0168968 A1    Aug. 3, 2006

(51) Int. Cl.
*F02C 7/22* (2006.01)
*B63H 11/00* (2006.01)

(52) U.S. Cl. .......................................... 60/778; 60/204
(58) Field of Classification Search .................... 60/204, 60/226.1, 772, 778; 244/58; 324/772, 545
See application file for complete search history.

(56) References Cited

U.S. PATENT DOCUMENTS

| | | | |
|---|---|---|---|
| 2,016,253 A | 10/1935 | Noblitt et al. |
| 2,512,155 A | 6/1950 | Hill |
| 2,777,301 A | 1/1957 | Kuhn |
| 2,960,825 A | 11/1960 | Sampietro |
| 2,988,302 A | 6/1961 | Smith |
| 3,033,307 A | 5/1962 | Sanders et al. |
| 3,057,170 A | 10/1962 | Brahm |
| 3,060,684 A | 10/1962 | Holmes |
| 3,105,631 A | 10/1963 | Hahny |
| 3,177,679 A | 4/1965 | Quick |
| 3,194,026 A | 7/1965 | La Fluer |
| 3,321,930 A | 5/1967 | La Fluer |

(Continued)

FOREIGN PATENT DOCUMENTS

CA      2261730      2/1998

(Continued)

OTHER PUBLICATIONS

Brady, Chris, The 737 APU: Auxilary Power Unit, The APU described, <http://www.b737.org.uk/apu.htm>, updated Jun. 18, 2007, accessed Aug. 9, 2007.

(Continued)

*Primary Examiner*—Devon C Kramer
*Assistant Examiner*—Gerald L Sung
(74) *Attorney, Agent, or Firm*—Perkins Coie LLP

(57) ABSTRACT

Methods and systems for starting aircraft turbofan engines are disclosed. A system in accordance with one embodiment includes an electrically-powered starter motor coupled to a turbofan engine to provide power to the turbofan engine during an engine start procedure. The system can further include an on-board, deployable, ram air driven turbine coupled to an electrical generator, which is in turn coupled to the starter motor to provide electrical power to the starter motor. In other embodiments, the ram air driven turbine can be replaced with a fuel cell or a battery. In still further embodiments, a single controller can control operation of both the engine starter and other motors of the aircraft.

8 Claims, 4 Drawing Sheets

U.S. PATENT DOCUMENTS

| | | |
|---|---|---|
| 3,353,626 A | 11/1967 | Cremer et al. |
| 3,437,173 A | 4/1969 | Ehrich |
| 3,439,774 A | 4/1969 | Callaway et al. |
| 3,519,843 A | 7/1970 | Trautman |
| 3,648,803 A | 3/1972 | Heath et al. |
| 3,680,660 A | 8/1972 | Dubois |
| 3,683,749 A | 8/1972 | Bayles |
| 3,764,815 A | 10/1973 | Habock et al. |
| 3,913,702 A | 10/1975 | Wirt et al. |
| 3,920,095 A | 11/1975 | Clark |
| 4,001,892 A | 1/1977 | Castelli |
| 4,064,961 A | 12/1977 | Tseo |
| 4,091,613 A | 5/1978 | Young |
| 4,091,892 A | 5/1978 | Hehmann et al. |
| 4,137,992 A | 2/1979 | Herman |
| 4,226,297 A | 10/1980 | Cicon |
| 4,244,441 A | 1/1981 | Tolman |
| 4,312,191 A | 1/1982 | Biagini |
| 4,314,621 A | 2/1982 | Hansen |
| 4,359,136 A | 11/1982 | Eriksson |
| 4,360,075 A | 11/1982 | Blaser et al. |
| 4,370,560 A | 1/1983 | Faulkner et al. |
| 4,371,053 A | 2/1983 | Jones |
| 4,418,879 A | 12/1983 | Vanderleest |
| 4,419,926 A | 12/1983 | Cronin et al. |
| 4,426,911 A | 1/1984 | Robinson |
| 4,434,624 A | 3/1984 | Cronin et al. |
| 4,456,830 A | 6/1984 | Cronin |
| 4,462,561 A | 7/1984 | Cronin |
| 4,494,372 A | 1/1985 | Cronin |
| 4,503,666 A | 3/1985 | Christoff |
| 4,514,976 A | 5/1985 | Christoff |
| 4,523,517 A | 6/1985 | Cronin |
| 4,533,097 A | 8/1985 | Aldrich |
| 4,546,939 A | 10/1985 | Cronin |
| 4,645,032 A | 2/1987 | Ross et al. |
| 4,684,081 A | 8/1987 | Cronin |
| 4,694,654 A | 9/1987 | Kawamura et al. |
| 4,706,908 A | 11/1987 | Huffman et al. |
| 4,744,440 A | 5/1988 | Hanson |
| 4,759,515 A | 7/1988 | Carl |
| 4,762,294 A | 8/1988 | Carl |
| 4,910,414 A | 3/1990 | Krebs |
| 4,979,587 A | 12/1990 | Hirt et al. |
| 5,074,495 A | 12/1991 | Raymond |
| 5,145,124 A | 9/1992 | Brunskill et al. |
| 5,152,141 A * | 10/1992 | Rumford et al. ............... 60/778 |
| 5,162,620 A | 11/1992 | Ross et al. |
| 5,268,541 A | 12/1993 | Pettersson |
| 5,299,763 A | 4/1994 | Bescoby et al. |
| 5,309,029 A | 5/1994 | Gregory et al. |
| 5,323,603 A | 6/1994 | Malohn |
| 5,365,025 A | 11/1994 | Kraai et al. |
| 5,490,645 A | 2/1996 | Woodhouse |
| 5,535,601 A | 7/1996 | Teraoka et al. |
| 5,655,359 A | 8/1997 | Campbell |
| 5,709,103 A | 1/1998 | Williams |
| 5,734,239 A | 3/1998 | Turner |
| 5,735,116 A | 4/1998 | Mouton et al. |
| 5,813,630 A | 9/1998 | Williams |
| 5,899,085 A | 5/1999 | Williams |
| 5,899,411 A | 5/1999 | Latos et al. |
| 5,902,970 A | 5/1999 | Ferri |
| 5,967,461 A | 10/1999 | Farrington |
| 6,018,233 A | 1/2000 | Glennon |
| 6,039,287 A | 3/2000 | Liston et al. |
| 6,092,360 A | 7/2000 | Hoag et al. |
| 6,158,546 A | 12/2000 | Hanson et al. |
| 6,241,182 B1 | 6/2001 | Durandeau |
| 6,244,539 B1 | 6/2001 | Liston et al. |
| 6,264,137 B1 | 7/2001 | Sheoran |
| 6,272,838 B1 | 8/2001 | Harvell et al. |
| 6,308,915 B1 | 10/2001 | Liston et al. |
| 6,360,844 B2 | 3/2002 | Hogeboom et al. |
| 6,508,219 B2 | 1/2003 | Schorn |
| 6,526,775 B1 | 3/2003 | Asfia |
| 6,615,576 B2 | 9/2003 | Sheoran et al. |
| 6,651,929 B2 | 11/2003 | Dionne |
| 6,681,592 B1 | 1/2004 | Lents et al. |
| 6,695,094 B2 | 2/2004 | Moffat et al. |
| 6,698,180 B2 | 3/2004 | Snyder |
| 6,704,625 B2 | 3/2004 | Albero et al. |
| 6,735,951 B2 | 5/2004 | Thompson |
| 6,755,375 B2 | 6/2004 | Trikha |
| 6,777,822 B1 | 8/2004 | Suttie et al. |
| 6,928,832 B2 | 8/2005 | Lents et al. |
| 7,121,100 B2 | 10/2006 | Atkey et al. |
| 7,207,521 B2 | 4/2007 | Atkey |
| 7,210,652 B2 | 5/2007 | Hein et al. |
| 7,210,653 B2 | 5/2007 | Atkey et al. |
| 2002/0113167 A1 | 8/2002 | Albero |
| 2002/0139120 A1 | 10/2002 | Sheoran et al. |
| 2004/0129835 A1 | 7/2004 | Atkey et al. |
| 2005/0051668 A1 | 3/2005 | Atkey et al. |
| 2006/0043236 A1 | 3/2006 | Campbell |
| 2006/0061213 A1 | 3/2006 | Michalko |
| 2006/0071123 A1 | 4/2006 | Nguyen |
| 2006/0102779 A1 | 5/2006 | Campbell |
| 2006/0102790 A1 | 5/2006 | Atkey et al. |
| 2006/0219842 A1 | 10/2006 | Shell et al. |
| 2007/0063098 A1 | 3/2007 | Dionne |

FOREIGN PATENT DOCUMENTS

| | | |
|---|---|---|
| DE | 69712210 | 10/2002 |
| DE | 69712797 | 11/2002 |
| EP | 0 888 966 A2 | 7/1999 |
| EP | 1010618 (A2) | 6/2000 |
| EP | 1010618 (A3) | 6/2000 |
| EP | 0923488 | 4/2002 |
| EP | 1010618 (B1) | 5/2002 |
| EP | 1686058 | 8/2006 |
| JP | 57-113919 | 7/1982 |
| JP | 05-163925 | 6/1993 |
| JP | 2000516553 | 12/2000 |
| WO | WO-98/05553 | 2/1998 |
| WO | WO-9805553 | 2/1998 |
| WO | WO-01/47100 | 6/2001 |
| WO | WO-02/066323 | 8/2002 |
| WO | WO-2004/037641 | 5/2004 |

OTHER PUBLICATIONS

Image of AC/DC Metering Panel, <http://www.b737.org.uk/acdcmeteringpanel.jpg>, accessed Aug. 9, 2007.

What About Transfer Switches?; http://www.generatorjoe.net/html/WhatAboutsws.htlm>, copyright Quartz Castle Inc. & Generator Joe, accessed Aug. 9, 2007, 8 pgs.

"Aircraft Electric Secondary Power," Proceedings of a Conference held at NASA Lewis Research Center, Cleveland, Ohio, Sep. 14-17, 1982, NASA Conference Publication 2282, 50 pgs.

"All-Electric Aircraft, vol. I," presented at IEEE/AESS Symposium, Dayton, Ohio, Nov. 30, 1983, 90 pgs.

Air Force Research Laboratory/AFRL, Science and Technology for Tomorrow's Aerospace Forces, Success Story, F-16 Test Aircraft Completes Long Distinguished Career (2 pages) (Date Unknown. Subject of article may be material to this application).

Boeing Airline Magazine, Oct./Dec. '94, p. 13, Figure 5.

Chang, M. et al., Preliminary (Issue #3) Power-by-Wire Development and Demonstration—Power Management and Distribution Requirements and Specifications; McDonnell Douglas Aerospace Transport Aircraft; Jun. 1995; 119 pgs.

Chang, M. et al.; Preliminary (Issue #1) Power-by-Wire Development and Demonstration—Electrical Power Center Module Requirements and Specifications; McDonnell Douglas Aerospace Transport Aircraft; Nov. 1994; 102 pgs.

Electrical Actuation for Aircraft Flight Control Surfaces, Dec. 2001 (2 pages); http://www.afrlhorizons.com/Briefs/Dec01/PR0103.html [Accessed Aug. 1, 2003].

Electrically Powered Actuators, Aerospatiale Matra Airbus 2000 (1 page).

GE Develops a Starter/Generator with Pentek Boards, Written in the Summer of 1994, Updated: Summer 1996 (2 pages).

Goldberg, Joshua et al., "AAIA 98-DCHS, A Commercial Application of the electro-Expulsive Deicing System," 36th Aerospace Sciences Meeting & Exhibit, Jan. 12-15, 1998, Reno, Nevada, 8 pgs.

Groom, Nelson J. et al., "Electric Flight Systems," NASA Conference Publications 2202, Hampton, Virginia, Jun. 9-10, 1981, 272 pgs.

Holly, Harold C., "The Closed-Loop Air-Cycle Option for Equipment Cooling on Aircraft," SAE Technical Paper Series, The Engineering Resource for Advancing Mobility, Fourteenth Intersociety Conference on Environmental Systems, Jul. 16-19, 1984, San Diego, California, 9 pgs.

IEEE 1983 National Aerospace and Electronics Conference, NAECON 1983, pp. i-ii, 74-79.

Meeting Minutes from the NASA PBW Critical Design Review (CDR); McDonnell Douglas Aerospace Transport Aircraft; Jul. 9, 1996; 447 pgs.

Murray, W. E. et al., "Evlauation of All-Electric Secondary Power for Transport Aircraft," NASA Contractor Report 189077, Jan. 1992, 314 pgs.

Power-by-Wire Program; Oct. 19, 1993; NASA Lewis Planning Meeting: Cleveland, OH; 64 pgs.

Rosenbush, Fred M., "ECS Schemes for All Electric Airliners", SAE Technical Paper Series, The Engineering Resource for Advancing Movility, Twelfth Intersociety Conference on Environmental Systems, Jul. 19-21, 1982, San Diego, California, 14 pgs.

Tagge, G.E., et al., "Systems Study for an Integrated Digital/Electric Aircraft (IDEA)," NASA, 1985, 214 pgs.

Weimer, Joseph A., "21st Century Plane, Powering the United States Air Force," Presented at Indiana Energy Technology Sizzle, Purdue University, Nov. 11, 2004, 14 pgs.

Williams, Kenneth R., "Integrated Power Systems for Future Transport Aircraft," Transport Aircraft Division; McDonnell Douglas Aerospace; Jan. 3, 1997; 8 pgs.

Aries Limited, "Model "A" Ford Tapered Muffler," mhtml:file;//C:/TEMP/Model%20A%20Ford%20Tapered%20Muffler.mht, 1 page [Accessed May 28, 2004].

Henri Coanda, mhtml:file://C:\TEMP\Henri%20Coanda.mht, pp. 1-3 [Accessed May 28, 2004].

Michael Andretti Powersports, "Titanium Oval Muffler," mhtml:file:// C:\TEMP\OVAL%20MUFFLER%20step%20increases.mht, pp. 1-2 [May 28, 2004].

European Search Report for GB0602223.0; The Boeing Company; May 30, 2006; European Patent Office; 2 pgs.

* cited by examiner

SYSTEMS AND METHODS FOR STARTING AIRCRAFT ENGINES

TECHNICAL FIELD

The present invention is related generally to systems and methods for starting aircraft engines.

BACKGROUND

Modern commercial jet aircraft have turbofan engines that are started using one or more of a variety of different engine starters. For example, smaller business jets typically include a direct current (DC) motor powered by an on-board battery or a ground power source. While suitable for smaller jets, this arrangement may not be suitable for larger commercial jets because of the high weight associated with batteries large enough to supply starting power for larger turbofan engines.

Another method used for starting larger commercial transport aircraft engines is disclosed in U.S. Pat. No. 4,456,830 to Cronin, and includes using ground-supplied electrical power coupled to an alternating current (AC) starter motor. The AC motor initiates the engine starting process in a synchronous manner that is coordinated with the engine rotation speed. An on-board auxiliary power unit (APU) takes over supplying power to the starter motor after the engine speed achieves five percent to ten percent of the high pressure rotor speed. After the engine speed further increases, fuel is injected into the engine combustion chamber and is ignited in a "light off" process. The starter is subsequently cut out.

The foregoing methods are directed primarily to starting an aircraft engine while the aircraft is on the ground. However, in some cases, the engine must be restarted in flight. Most existing arrangements for in-flight restart rely on the engine "windmilling" (i.e., rotating in the free stream flow) to provide initial power. The power supplied by windmilling may be supplemented with an APU-driven pneumatic starter. This arrangement may be less than optimal for at least the following reasons. First, the pneumatic starter adds weight to the aircraft. Second, the current trend in aircraft engine design is to increase both the bypass ratio and the overall pressure ratio of aircraft engines so as to increase engine efficiency. However, engines having higher bypass ratios and overall pressure ratios may be more difficult to start using the windmilling procedure described above.

SUMMARY

The present invention is directed generally toward methods and systems for starting aircraft engines. An aircraft propulsion system in accordance with one aspect of the invention includes an aircraft turbofan engine and an electrically-powered starter motor coupled to the turbofan engine to provide power to the turbofan engine during an engine start procedure. The system can further include an on-board, deployable, ram air driven turbine coupled to an electrical generator, which is in turn coupled to the starter motor to provide electrical power to the starter motor. In another aspect of the invention, the ram air driven turbine can be replaced with an on-board fuel cell. In still further embodiments, the starter motor can include an electrically-powered, alternating current starter motor/generator that is coupled to an on-board battery system to provide electrical power to the starter motor/generator.

In another aspect of the invention, the propulsion system can include an aircraft turbofan engine and a starter motor/generator coupled to the turbofan engine to provide power to the turbofan engine during an engine start procedure. The system can further include an additional motor coupleable to a system other than the propulsion system, and a single controller coupled to both the starter motor/generator and the additional motor. The single controller can be configured to control the speed of both the starter motor/generator and the additional motor.

Methods in accordance with still further aspects of the invention can include allowing an unstarted turbofan engine of an aircraft to windmill during flight, and starting the turbofan engine by directing electrical power from an on-board, gas turbine-driven aircraft auxiliary power unit to a starter motor coupled to the turbofan engine. In other aspects of the invention, the turbofan engine can be started in flight using a ram air driven turbine deployed into an airstream adjacent to the aircraft, or using a fuel cell.

DETAILED DESCRIPTION

The present disclosure describes systems and methods for starting aircraft turbofan engines, both on the ground and in flight. Certain specific details are set forth in the following description and in FIGS. 1-5 to provide a thorough understanding of various embodiments of the invention. Well-known structures, systems, and methods often associated with these systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
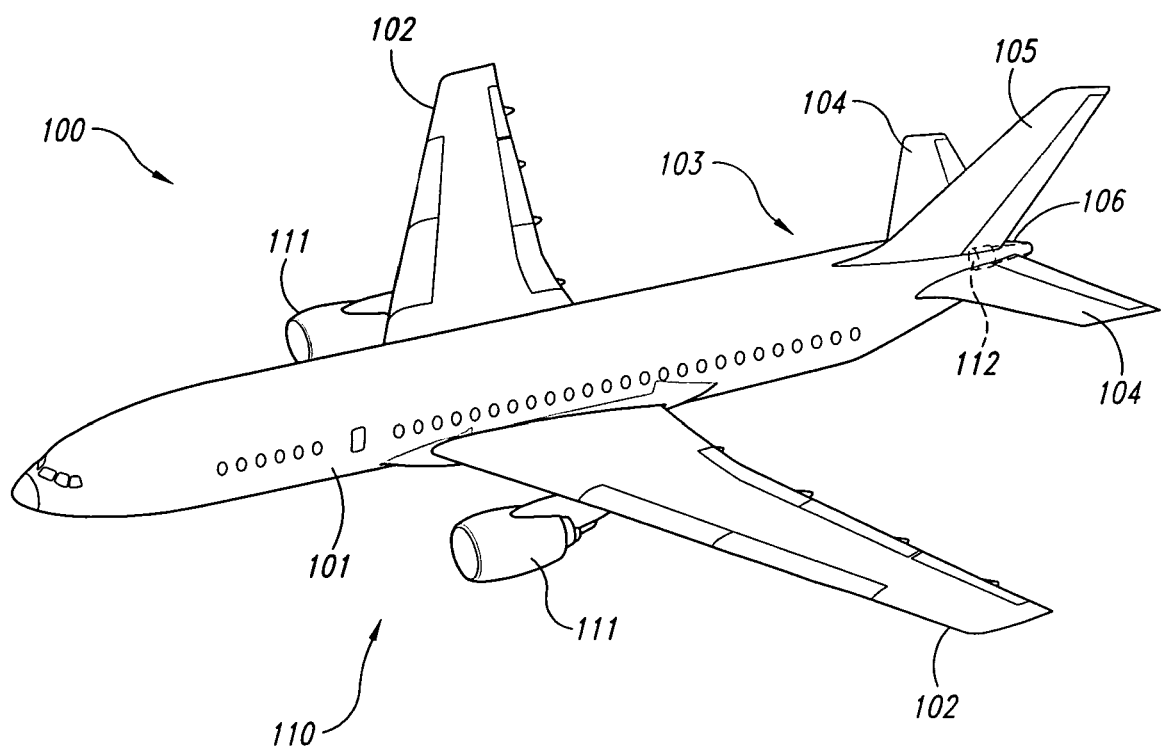
FIG. 1 is a partially schematic, isometric illustration of an aircraft having a propulsion system configured in accordance with an embodiment of the invention.

FIG. 1 illustrates an aircraft 100 having a propulsion system 110 configured in accordance with an embodiment of the invention. The propulsion system 110 can include multiple turbofan engines 111 (two are shown in FIG. 1). In a particular embodiment shown in FIG. 1, the engines 111 are carried by the wings 102 of the aircraft 100. In other embodiments, the engines 111 can be carried by the fuselage 101 and/or the empennage 103. The empennage 103 can support horizontal stabilizers 104, a vertical stabilizer 105, and a tail cone 106. The tail cone 106 can in turn house an auxiliary power unit (APU) 112, which can be coupled to the turbofan engines 111 as described in greater detail below with reference to FIG. 2.

Figure 2:
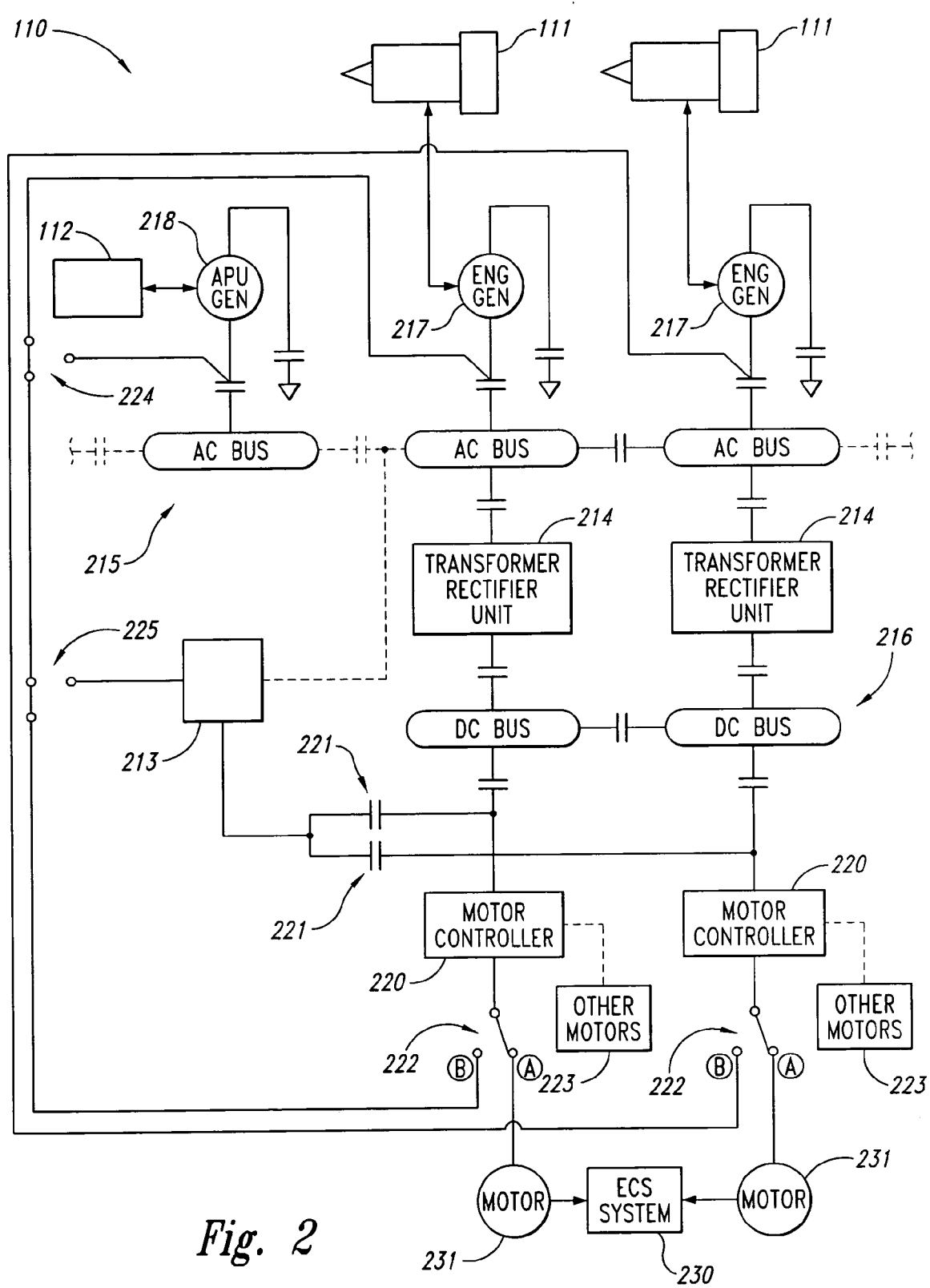
FIG. 2 is a schematic illustration of a propulsion system that includes a starting arrangement configured in accordance with an embodiment of the invention.

FIG. 2 is a schematic illustration of the propulsion system 110 initially described above with reference to FIG. 1. In at least some embodiments, each turbofan engine 111 can have a relatively high bypass ratio (e.g., 4.5-8 or higher) and/or a relatively high overall pressure ratio (e.g., 20-45 or higher). Each turbofan engine 111 can be coupled to a starter motor/generator 217, which is in turn coupled to an alternating current (AC) bus 215. During engine starting, the starter motor/generator 217 provides power to the turbofan engine 111, and after the turbofan engine 111 is started, the starter motor/generator 217 can extract power from the turbofan engine 111 for use by other aircraft systems. In one embodiment, each starter motor/generator 217 includes a synchronous AC device, without a permanent magnet main field (e.g., a brushless, synchronous motor or an induction motor). Accordingly, the magnetic field can be selectively deactivated even while the starter motor/generator 217 rotates, which can make fault isolation easier if the starter motor/generator 217 malfunctions. This can allow removal of a fault without disconnecting the generator shaft or decoupling the generator shaft from the engine gear box.

The propulsion system 110 can also include the APU 112, which has a separate APU generator 218, also coupled to the AC bus 215. During at least some engine start procedures, or portions of engine start procedures, the APU 112 can provide power to the AC bus 215 via the APU generator 218. This power can in turn be provided to the starter motor/generators 217 to start the turbofan engines 111. Power can also be provided by a separate power source 213, in addition to, or in lieu of the power provided by the APU 112. The power source 213 can (optionally) be coupled to multi-function motor controllers, as described in greater detail below.

In an embodiment shown in FIG. 2, the APU 112 and the turbofan engines 111 provide alternating current to the AC bus 215, which in turn provides power to a DC bus 216 via power conditioners 214 (e.g., transformer/rectifier units). The DC bus 216 can provide power to motors that are used by other subsystems of the aircraft. For example, the DC bus 216 can provide power to additional motors 231 that in turn are coupled to an environmental control system (ECS) 230. Accordingly, the additional motors 231 can pump air throughout the cabin of the aircraft for passenger safety and comfort, via electrical power extracted from the turbofan engines 111. The DC bus 216 can also supply power to other motors 223, for example, hydraulic fluid pumps that pressurize hydraulic fluid for controlling other aircraft functions, fuel pumps, fuel tank inerting pumps, and/or flight control systems.

In a particular aspect of an embodiment shown in FIG. 2, the additional motors 231 (and optionally, the other motors 223) are coupled to motor controllers 220 that are also coupled to the power source 213 via intervening power source switches 221. When the turbofan engines 111 are started and the aircraft is operating normally, the power source switches 221 are opened and the controller switches 222 are moved to position A. Accordingly, the motor controllers 220 control the speed, torque, power, and/or other characteristics of the additional motors 231 and (optionally) the other motors 223. When the power source 213 is required to assist in starting the turbofan engines 111, the power source switches 221 can be closed (e.g., one at a time, as each turbofan engine 111 is started) to couple the power source 213 to the motor controllers 220. The controller switches 222 can be moved to position B to couple each motor controller 220 to a corresponding one of the starter motor/generators 217. In this configuration, the power source 213 provides power directly to the starter motor/generators 217 via the same motor controller 220 as is used to control the additional motors 231 and the other motors 223. In a further aspect of this arrangement, one motor controller 220 (as shown in FIG. 2) or both motor controllers 220, can also provide starting power to the APU 112. Accordingly, the system 110 can include an APU switch 224 that can be selectively positioned to provide power to the APU 112 or one of the turbofan engines 111.

The foregoing arrangement can make more efficient use of the motor controllers 220. For example, in a particular embodiment, each motor controller 220 can include output filters, analog controls, a power stage that receives a DC input and provides an AC output, and software that controls the speed and power supplied to each motor. At least some of these elements (e.g., the power stage, the output filters, and the analog controls) can be shared by all the motors controlled by the motor controller 220. Certain other elements of the motor controller 220 (e.g., the controlling software) can be separate for each controlled motor. An advantage of this arrangement is that providing a single controller 220 to control multiple motors can significantly reduce the overall weight of the systems required to control these motors. By reducing the weight of the controls required by these motors, the overall efficiency of the aircraft in which the controls are installed can be increased, and the operating costs of the aircraft can be reduced.

Figure 3A:
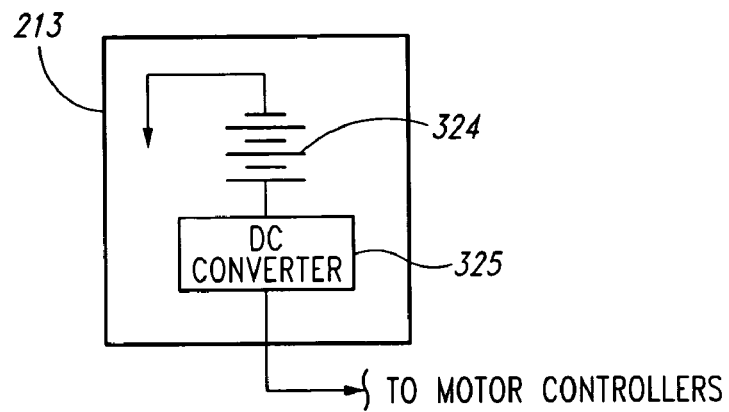
FIGS. 3A-3C are partially schematic illustrations of power sources for starting aircraft turbofan engines in accordance with further embodiments of the invention.
Figure 3B:
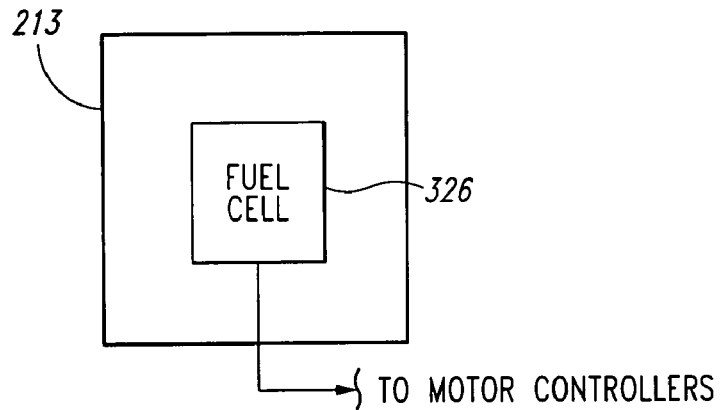
Figure 3C:
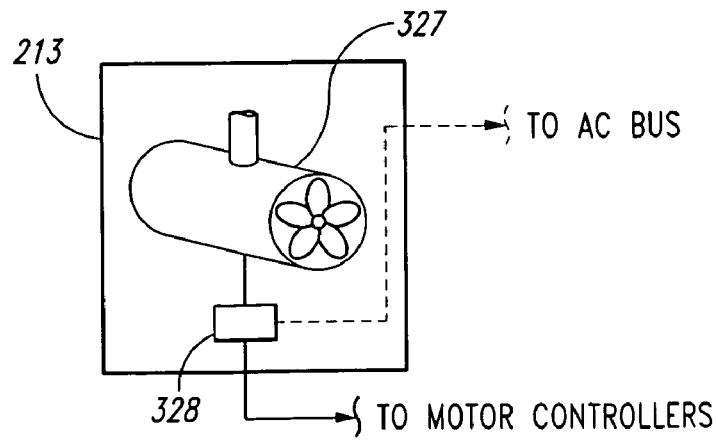

The power source 213 shown in FIG. 2 can include one or more of several types of devices. Representative examples of these devices are shown in FIGS. 3A-3C. Beginning with FIG. 3A, the power source 213 can include a battery 324 and DC converter 325 that steps up the voltage provided by the battery 324. Because the battery 324 and DC converter 325 provide a DC current, the power source 213 can be coupled directly to the motor controllers 220, which in one aspect of this embodiment, require direct current.

Referring next to FIG. 3B, the power source 213 can include a fuel cell 326, which also provides a direct current directly to the motor controllers 220. The fuel cell 326 can include a hydrogen fuel cell in one embodiment, and in other embodiments, can include any other electrochemical cell in which energy is generated as a result of a reaction between a fuel and an oxidant.

In still a further embodiment, shown in FIG. 3C, the power source 213 can include a deployable ram air driven turbine 327. The ram air driven turbine 327 can be coupled to a generator 328 to produce a DC current, and can accordingly be coupled directly to the motor controllers 220, as described above with reference to FIGS. 2-3B. In another aspect of this embodiment, the generator 328 can be configured to produce an alternating current and can be coupled to the AC bus 215 instead of being coupled directly to the motor controllers 220. In still another aspect of this embodiment, the power source 213 can include provisions for being coupled both to the motor controllers 220 directly and to the AC bus 215 (as indicated by a dashed line in FIG. 2), and can provide power to the starter motor/generators 217 (FIG. 2) selectively via either link.

Referring now to FIGS. 2 and 3C together, the ram air driven turbine 327 included in the power source 213 can be selectively coupled to one (or both) of the motor controllers 220 via a switch 225. Accordingly, the motor controller 220 can be used to provide power to the power source 213 for on-ground functional checking of the power source 213. For example, the motor controller 220 can provide electrical power to the generator 328, so that the generator 328 operates as a motor that drives the ram air driven turbine 327. A ground crew can use this method to functionally check the operation of both the generator 328 and the ram air driven turbine 327 (e.g., the blade pitch controller of the ram air driven turbine 327). This is unlike current testing methods, which require the ground crew to set up a high speed wind generator next to the aircraft fuselage, or remove the ram air driven turbine 327 (and/or the generator 328) for a bench test. Both of these existing methods are more expensive and complex than the in situ method described above with reference to FIGS. 2 and 3C.

The ram air driven turbine 327 can include a deployable turbine that is normally stowed within the fuselage or other portion of the aircraft, and is deployed only when required for power generation. Accordingly, the ram air driven turbine 327 is typically suitable for starting or assisting in starting the turbofan engines 111 only while the aircraft is in flight. Power sources 213 having different configurations (e.g., the battery 324 shown in FIG. 3A and the fuel cell 326 shown in FIG. 3B) can be used both for an on-ground start and for an in flight restart. In some embodiments, the power source 213 can be deliberately sized for in-flight restarts (e.g., with the assumption that at least some starting power will be available via windmilling). Accordingly, the power source 213 can provide less power than is required to start the engine from a dead stop. In other embodiments, the power source 213 can include other devices, e.g., a hydraulic motor driven generator. Particular methods for starting aircraft engines using any of the foregoing devices are described below with reference to FIG. 4.

Figure 4:
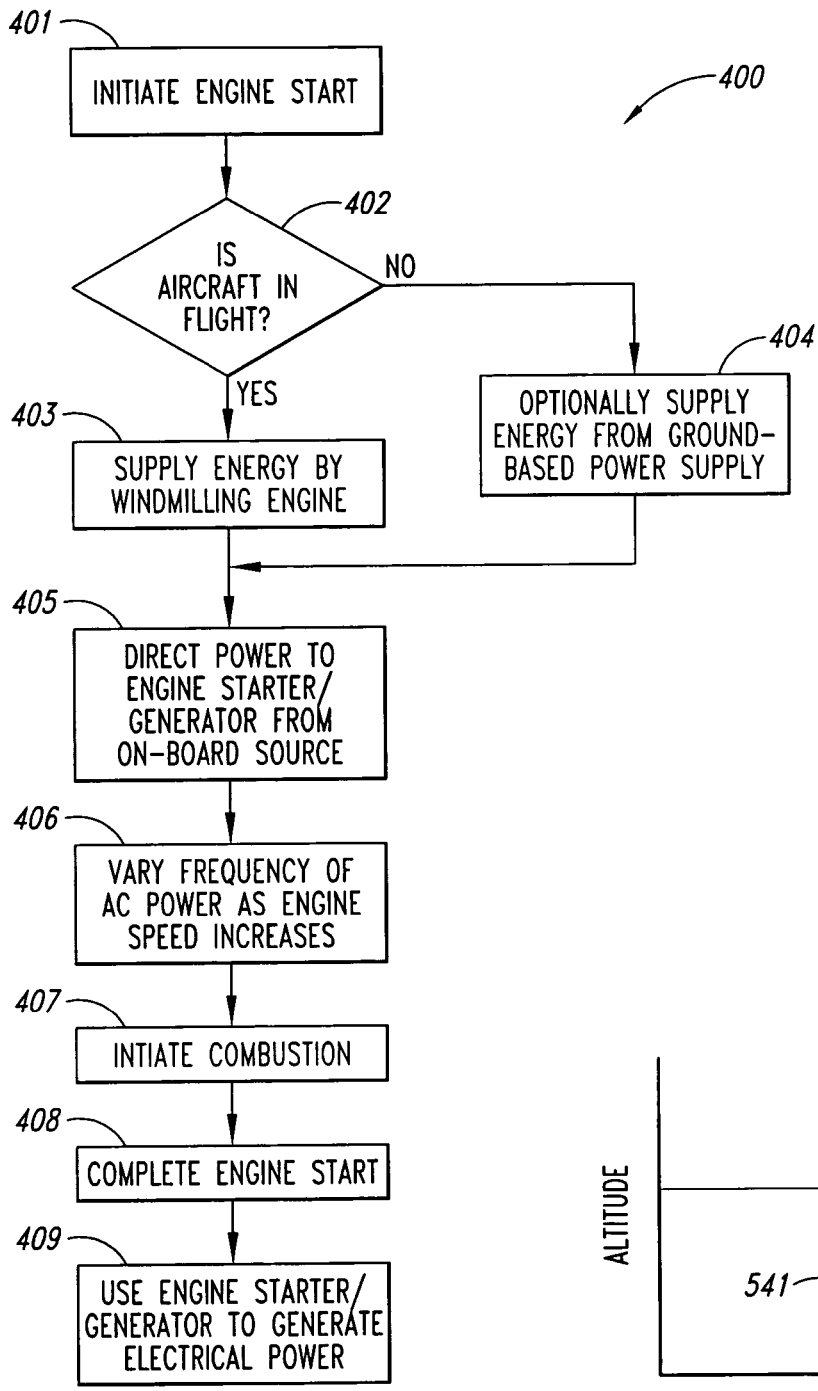
FIG. 4 is a flow diagram illustrating a method for starting aircraft turbofan engines in accordance with an embodiment of the invention.

FIG. 4 illustrates a process 400 for starting and operating an aircraft engine. The following discussion also refers to elements shown in FIG. 2. Referring to FIGS. 2 and 4 together, process portion 401 includes initiating an engine start procedure (e.g., via a pilot command). In process portion 402, it is determined whether or not the aircraft is in flight. If the aircraft is in flight, at least some of the energy required to start the turbofan engine can be provided by windmilling the turbofan engine (process portion 403). If the aircraft is not in flight, at least some of the energy required to start the turbofan engine can (optionally) be supplied from a ground-based power supply. Alternatively, all the power required to start the turbofan engine can be provided from an on-board source. In a particular embodiment, all the power required to bring the engine up to a self-sustaining state (e.g., idle power) can be provided from a ground-based DC source, then converted to AC power on-board the aircraft, and provided to a synchronous starter motor/generator.

In process portion 405, power is directed to an engine starter motor/generator (coupled to the turbofan engine) from the on-board power source (e.g., the power source 213, shown in FIG. 2). As described above, the on-board power source 213 can have one or more of several different configurations, including a battery, a fuel cell, and a ram air driven turbine. In some cases, the power provided by the power source 213 can be supplemented by a separate power source, e.g., the APU generator. Accordingly, the power source 213 can be used to provide an initial level of power to the starter motor/generator, and the APU and APU generator can provide additional power after the turbofan engine has achieved a threshold rotation speed. In other embodiments, the power source 213 alone can have sufficient capacity to start the turbofan engine without assistance from the APU and the APU generator. In a particular aspect of this embodiment, the capability of the power source 213 alone may be sufficient to start the turbofan engine only when the turbofan engine is windmilling and is started in flight.

In any of the foregoing embodiments, the process 400 can further include varying a frequency of the AC power provided to the turbofan engine as the engine speed increases (process portion 406). Accordingly, this process portion can include receiving a signal from one or more sensors that indicate the rotation speed of components of the turbofan engine, and can automatically adjust the frequency of the power provided to the starter motor/generator in accordance with the increasing speed of the turbofan engine. In process portion 407, combustion is initiated in the turbofan engine by injecting fuel into the combustion chamber and igniting the fuel. In process portion 408, the engine start process can be completed. In at least one embodiment, completing the engine start process can include decoupling the engine starter motor/generator from the engine at approximately the time at which the engine achieves idle speed. To provide an operating margin, the starter motor/generator can be decoupled shortly after engine idle speed is reached. The engine starter motor/generator can subsequently be recoupled to the turbofan engine to act as a generator rather than a starter and can accordingly generate electrical power for other aircraft systems (process portion 409). For multi-engine aircraft, the foregoing process can be completed for each turbofan engine. In other embodiments, once one turbofan engine is started, it (rather than another on-board power source) can be used to start the remaining turbofan engine or engines.

Figure 5:
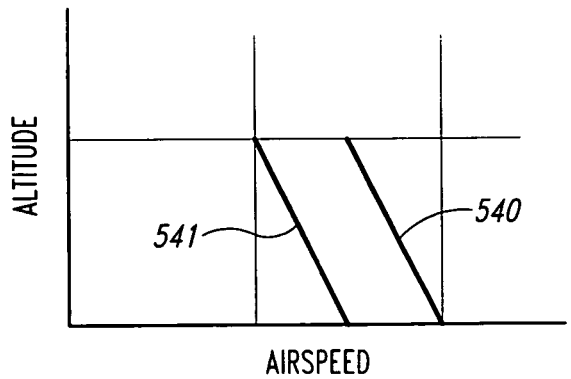
FIG. 5 is a graph illustrating flight regimes in which an aircraft turbofan engine may be restarted.

FIG. 5 is a graph of altitude and air speed, illustrating the boundaries above which an in-flight engine restart is possible. Line 540 identifies the restart boundary for the aircraft engine when starting power is provided by windmilling alone. Line 541 identifies the restart boundary when energy is provided to the engine by windmilling and also by an on-board power source. Accordingly, FIG. 5 indicates that, at any given altitude, the speed above which the aircraft must be flying to restart the engines can be significantly reduced when the windmilling power is supplemented by power from an on-board power source. An advantage of this arrangement is that the aircraft engines can be more easily restarted over a wider variety of flight conditions with on-board power than without. For example, the aircraft can be restarted at lower air speeds and accordingly will be less likely to have to dive in order to increase air speed up to a point sufficient for in-flight restart. This arrangement may be more comfortable for the passengers may allow restarts at lower altitudes and can reduce the time required for restart.

One feature of embodiments of system described above with reference to FIGS. 1-5 is that they can include a single motor controller that controls both an aircraft turbofan engine starter (or starter motor/generator) and at least one additional motor (e.g., an ECS system motor or hydraulic system motor). As discussed above, an advantage of this feature is that it can reduce aircraft weight by using a single motor controller structure to provide functionality to multiple motors.

Another feature of embodiments of the systems described above with reference to FIGS. 1-5 is that they can include an on-board electrical power source that can be used to generate power for starting the turbofan engines while the aircraft is on the ground and/or while the aircraft is in flight. In at least some embodiments, this power can be independent of the power provided by the APU, at least over a portion of the starting process. An advantage of this feature is that, by carrying the power source on-board, the aircraft need not rely on ground-based power sources for engine starting. Another advantage of this feature is that the aircraft in at least some cases need not rely on the APU for engine starting. Accordingly, if APU is not already started (as may be the case during many flight segments), the APU need not first be started before the main turbofan engine is restarted. This may allow additional time for restarting the turbofan engine because it may take less time to draw power from a battery, fuel cell, and/or ram air driven turbine than is required to start an APU.

Another feature of embodiments of the systems described above is that they can include power sources that provide electrical power directly to the engine starter motor/generator. Accordingly, the aircraft need not include a pneumatic starting capability and can instead rely on electrical hardware that is (at least for the most part) already in place to provide electrical power to the aircraft after the engine has been started. The engine starter motor/generator itself is an example of such hardware.

Still another feature of the embodiments of on-board electrical power sources described above is that they can be used to increase the range of flight conditions over which the aircraft can be restarted, by supplementing power available to the aircraft from windmilling the turbine engines. As discussed above, an advantage of this feature is that it can make the in flight restart procedure more comfortable for the passengers, and can increase the likelihood for successful in flight restarts.

Yet another feature of embodiments of the foregoing systems is that they can include provisions for ground-starting a turbofan engine from a DC ground-based power source using a DC/AC converter and an AC starter/generator. This is unlike some conventional systems, which use DC power and DC motors. One advantage of this feature is that AC current suffers from fewer losses than would DC current in a similar implementation, and accordingly, the AC motors/generators can receive ample power with smaller, lighter cables. Another advantage is that larger commercial transport aircraft (e.g., those with 100 seats or more) have many electrical subsystems that require different levels of voltage, and AC power is typically easier to transform to different voltages than is DC power.

From the foregoing, it will be appreciated that specific embodiments of the invention have been described herein for purposes of illustration, but that various modifications may be made without deviating from the spirit and scope of the invention. For example, the power sources shown in the Figures are shown with a single battery, fuel cell or ram air driven turbine. In other embodiments, the power sources can include multiple batteries, fuel cells or ram air driven turbines, and/or combinations of these elements. The AC starter/generators described above with reference to some embodiments can be replaced with DC starter/generators in some other embodiments. Aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. A method for operating a turbofan engine, comprising:
    allowing an unstarted turbofan engine of an aircraft to windmill during flight;
    deploying a ram air driven turbine into an airstream adjacent to the aircraft;
    extracting electrical power from the ram air driven turbine via an electrical generator coupled to the ram air driven turbine;
    starting the turbofan engine by directing the electrical power to a starter motor coupled to the turbofan engine; and
    testing at least one of the ram air driven turbine and the electrical generator on the ground by providing electrical power to the electrical generator while the ram air driven turbine is installed on the aircraft so as to operate the electrical generator as a motor to drive the ram air driven turbine.

2. The method of claim 1 wherein the starter motor includes a starter motor/generator and wherein the method further comprises extracting electrical power from the turbofan engine via the starter motor/generator after the turbofan engine is started.

3. The method of claim 1 wherein the unstarted turbofan engine is a first unstarted turbofan engine and wherein the method further comprises:
    allowing a second unstarted turbofan engine of the aircraft to windmill during flight; and
    starting the second turbofan engine by directing electrical power from the first turbofan engine to a starter motor coupled to the second turbofan engine, after starting the first turbofan engine.

4. The method of claim 1 wherein starting the turbofan engine includes starting the turbofan engine in the absence of a pneumatically powered starter.

5. The method of claim 1, further comprising stowing the ram air driven turbine after the engine starts.

6. The method of claim 1, further comprising starting the turbofan engine on the ground by:
    coupling the aircraft to a ground source of direct current electrical power;
    converting the direct current power to variable frequency alternating current power;
    directing the alternating current power to a synchronous starter motor/generator coupled to the turbofan engine to initiate rotation of engine components;
    varying the frequency of the alternating current power provided to the starter motor/generator as the rotation speed of the engine components increases;
    initiating combustion in the turbofan engine; and
    continuing to provide the alternating current power via the ground source at least until the turbofan engine achieves a self-sustaining state.

7. The method of claim 6 wherein the starter motor includes a starter motor/generator, and wherein the method further comprises:
    decoupling the aircraft from the ground source; and
    extracting electrical power from the engine via the starter motor/generator.

8. The method of claim 6, further comprising continuing to provide electrical power to the engine via the ground source after the engine achieves a self-sustaining state.

* * * * *